Oct. 26, 1965
C. R. NICHOLS ETAL
3,213,944
STABILIZING MEANS FOR HELICOPTERS
Filed Nov. 5, 1962
3 Sheets-Sheet 1
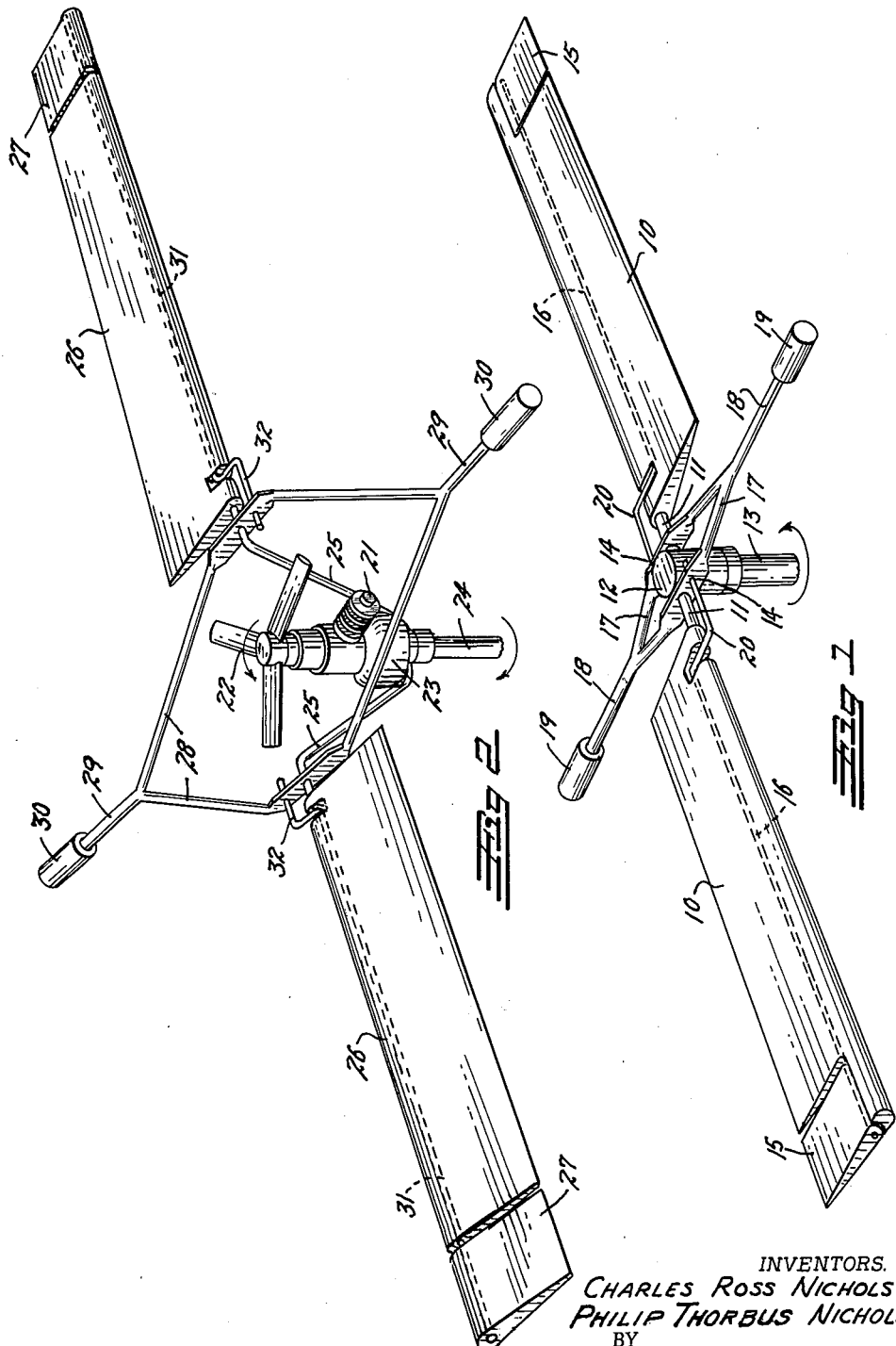
INVENTORS.
CHARLES ROSS NICHOLS
PHILIP THORBUS NICHOLS
BY
ATTORNEY

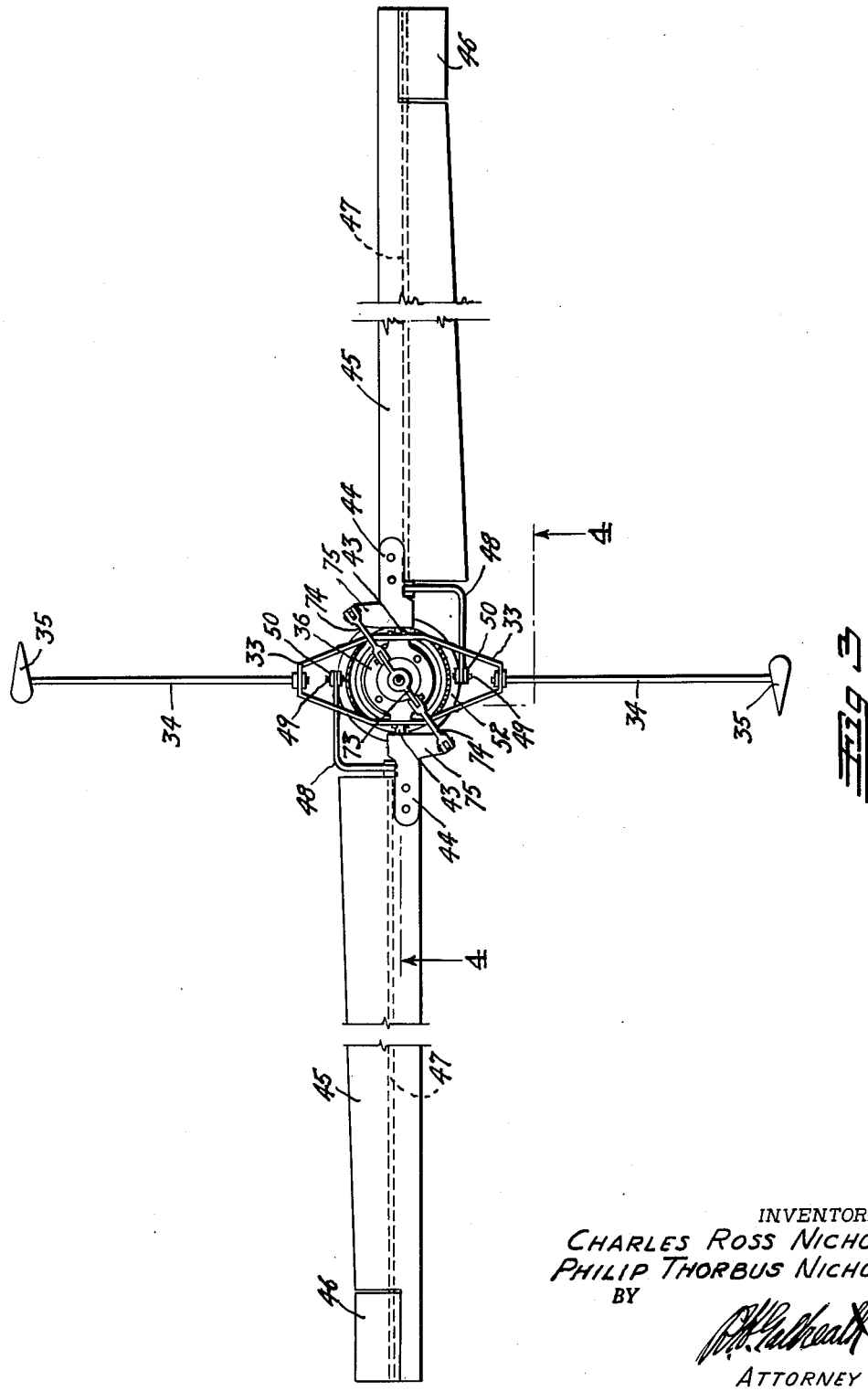

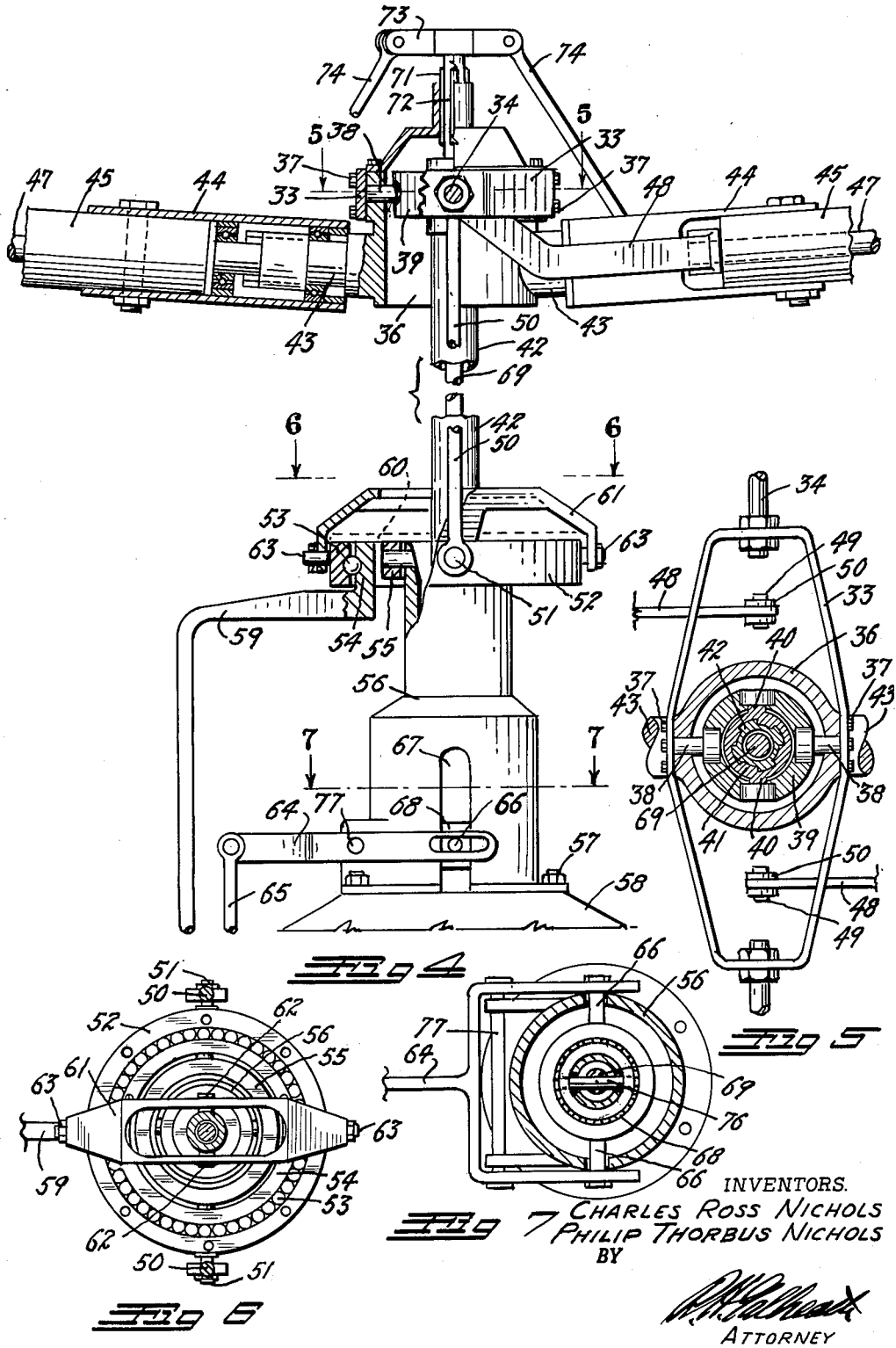

United States Patent Office 3,213,944
Patented Oct. 26, 1965

3,213,944
STABILIZING MEANS FOR HELICOPTERS
Charles Ross Nichols and Philip Thorbus Nichols, both of 7570 W. 48th Ave., Wheat Ridge, Colo.
Filed Nov. 5, 1962, Ser. No. 235,219
1 Claim. (Cl. 170—160.13)

This invention relates to helicopter aircraft and more particularly to stabilizing means for such aircraft.

The principal object of the invention is to provide means for automatically maintaining the aircraft inherently stable at all times through the medium of inertia-controlled ailerons on the blades of the rotor unit of the craft without interference with the setting or control of the pitch of the rotor blades.

Another object is to provide an automatic, inertia-controlled, rotor blade control flap or aileron system which tends to automatically and continuously maintain the plane of the rotor blade unit horizontal and which will automatically return the rotor blade plane to the horizontal should it be tilted for any reason without interfering in any way with pilot control of the pitch of the rotor blades.

A further object is to incorporate the above intertia-controlled ailerons in a miniature motor model helicopter to automatically stabilize the latter when in free flight.

A still further object is to combine in a helicopter a rotatable rotor blade unit and a propeller, the propeller being driven by a motor mounted on the rotor blade unit so that the direct drive of the motor will drive the propeller in one direction while the reaction of the motor will drive the rotor blade unit in the opposite direction, the propeller and the unit being so pitched that both will simultaneously force air downwardly to lift said aircraft.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawing:

FIG. 1 is fragmentary perspective view of a helicopter rotor blade unit with the invention applied thereto, illustrating the basic principle of this invention;

FIG. 2 is a similar fragmentary perspective view of the rotor blade unit of a model helicopter to which the invention has been applied;

FIG. 3 is a top plan view of a pilot controlled type of rotor blade unit employing the principle of this invention;

FIG. 4 is an enlarged fragmentary side elevational view of the hub portion of the rotor blade unit of FIG. 3 shown partially in section, the sectional portion being taken on the line 4—4, FIG. 3;

FIG. 5 is a fragmentary detail horizontal section taken on the line 5—5, FIG. 4;

FIG. 6 is a similar horizontal section taken on the line 6—6, FIG. 4; and

FIG. 7 is a similar horizontal detail section taken on the line 7—7, FIG. 4.

The general principle of operation of the improved helicopter stabilizing means is illustrated more simply and clearly in the model rotor blade unit of FIG. 1. The latter unit employs two diametrically opposed rotor blades 10. For simplicity, the rotor blades are illustrated as fixedly mounted. They could, if desired, be mounted for conventional inertia pitch control. The method of mounting the blades is optional. As illustrated, they are fixedly mounted at predetermined pitch upon arms 11 rigidly projecting from a mast head 12 mounted on a normally vertical mast 13. The mast 13 is mounted in and projects upwardly from the fuselage of the craft, as conventional in the art, to rotate the mast head 12. It is, of course, understood that rotation of the head 12 will cause the blades 10 to rotate in a rotor plane at right angles to the mast 13 as in the conventional helicopter.

A control aileron 15 is positioned at the tip extremity of each rotor blade 10. The ailerons 15 are mounted on aileron shafts 16 extending longitudinally of and rotatable within the blades 10. When in alignment with the blades, the ailerons 15 form a continuation of the airfoil of the blades. When tilted upwardly and downwardly, however, they create downward and upward reactions, respectively, upon the blades.

The tilting of the ailerons is automatically accomplished through the medium of a stabilizing element employing a tilting gyro frame 17 which is tiltably mounted on the rotor arms 11 at each side of the head 12. Two similar, axially-aligned fly bars or gyro bars 18 project oppositely outward from the gyro frame 17 at right angles to the longitudinal axis of the blades 10 and terminate in similar gyro weights 19. The above described stabilizing element rotates in unison with the blades in a plane which will be herein designated as the gyro plane. The inner extremities of the aileron shafts terminate in cranks 20 which engage the gyro frame 17 on opposite sides of the head 12 and eccentrically of the axis of the rotor arms 11 as shown at 14.

The cranks 20 are so arranged that when the gyroplane coincides with the rotor plane the ailerons 15 will longitudinally align with and form continuations of the blades 10.

When the rotor is rotating, the gyro bars 18 and their weights 19 have a gyroscopic action and tend to maintain the gyro plane horizontal, that is parallel to the earth, at all times. Should tilting of the craft impart an incline to the mast 13 so as to tilt the rotor plane from the horizontal, the angular differential between the gyro plane and the rotor plane will act through the cranks 20 to oppositely and properly pitch the ailerons 15 to quickly bring the rotor plane back to the normal horizontal position.

Attention is called to the fact that each aileron will start to incline downwardly when it reaches a point 90° in advance of the extreme low side of the rotor plane and will similarly start to incline upwardly when it reaches a point 90° in advance of the extreme high side of the rotor plane so as to quickly right the rotor plane. When the horizontal plane has been resumed, the ailerons will coincide with the airfoil of the blades and the rotor plane will remain coincident with the gyro plane until further disturbed by external forces. Thus, the rotor plane is automatically maintained parallel to the earth and the craft is automatically stabilized.

In FIG. 2, the above described stabilizing means has been applied to a small model helicopter blade system employing a miniature motor 21 vertically positioned to drive an air screw or propeller 22. The motor is mounted on a motor mount 23 which is free to rotate on a mast 24 extending upwardly from the fuselage of the craft.

Two blade arms 25 extend upwardly and oppositely outward from the motor mount 23 to support two rotor blades 26 provided with wing tip ailerons 27. The ailerons are automatically actuated to stabilize the rotor plane, as previously described by means of a gyro frame 28 tiltably mounted on the blade arms 25 and provided with oppositely projecting gyro bars 29 terminating in gyro weights 30. The ailerons 27 are controlled from the gyro frame 28 through the medium of aileron shafts 31 terminating in oppositely positioned cranks 32 engaging the gyro frame as previously described with reference to FIG. 1.

The direct drive of the motor 21 causes the propeller to rotate in one direction to direct air downwardly and the reaction of the motor rotates the rotor blades 26 in the opposite direction to exert a lifting action on the craft. The craft is stabilized by the gyroscopic action of the gyro frame 28 and weights 30 acting through the cranks 32 and the ailerons 27 as previously described with reference to the corresponding elements in FIG. 1.

The structures shown in FIGS. 1 and 2 relate more specifically to model planes, that is, to model helicopters having fixed or inertia controlled pitch to the rotor blades. The principle of the invention, however, can be carried into full size operating helicopters having pilot pitch control. Such an adaptation is shown in FIGS. 4, 5, 6 and 7.

The form shown in the latter figures is similar to the previously described forms, that is, it employs a tilting gyro frame 33 from which gyro bars 34 carrying gyro weights 35 rigidly and oppositely project so as to tend to maintain the gyro frame 33 in a preset plane due to gyroscopic action. The gyro frame 33 is rigidly mounted upon the opposite sides of a rotor head 36 such as through the medium of suitable cap screws 37. The rotor head 36 is tiltably mounted on pivot members 38 extending oppositely outward from a gimbal ring 39 which is in turn tiltably mounted on pivot studs 40 projecting oppositely from a mast collar 41 at right angles to the axis of the pivot members 38. The mast collar is fixedly mounted on and adjacent the upper extremity of a mast 42 extending downwardly to conventional driving means in the fuselage of the craft.

Blade axle members 43 extend oppositely outward from the rotor head 36 at right angles to and in a plane below the gyro bars 34. Blade support fittings 44 are rotatably mounted on the axle members 43 and a rotor blade 45 of proper design is fixedly mounted in each blade fitting 44 so that the blades will project oppositely outward from the rotor head 36.

It can be seen that, due to the universal mounting provided by the gimbal ring assembly, the entire rotor system can be freely and universally tilted in any direction relative to the mast 42. Therefore, tilting disturbances of the rotor plane will not be transmitted to the mast and to the air craft.

The rotor blades are provided with tip ailerons or flaps 46 mounted on flap shafts 47 extending longitudinally of the blades and terminating at their axial extremities in crank elements 48 as previously described with reference to FIGS. 1 and 2. The crank elements 48 terminate on crank pins 49 positioned within the gyro frame 33 substantially in axial alignment with the axes of the gyro bars 34.

A vertical connecting tube or rod 50 depends from each of the crank pins 49 and the connecting rods 50 are pivotally connected, at their lower extremities, upon pivot studs 51 projecting oppositely outward from a control ring element 52. The control ring element 52 is rotatably mounted through the medium of a suitable anti-friction ring bearing 53 upon a manual control ring 54. The manual control ring 54 is mounted, through the medium of a gimbal joint assembly 55 similar to the gimbal ring assembly previously described, with reference to the rotor head 36, upon the upper extremity of a base sleeve 56 which surrounds the mast 42 and extends downwardly to a fixed mounting 57 on the craft fuselage, indicated at 58. Thus, the manual control ring 54 is freely tiltable in any direction and all vertical angular movements of the control ring are transmitted through the connecting rods 50 into opposite tilting or pitch movements of the control flaps 46. Tilting movements are manually supplied to the control ring 54 by the pilot through the medium of a lever arm 59 fixedly secured to and projecting outwardly and downwardly from the manual control ring 54 to a position within convenient reach of the pilot. The gimbal and bearing assembly may be concealed and protected by a cover plate, the position of which is indicated in broken line at 60, and which has been removed in FIG. 6.

The control ring element 52 is caused to rotate in unison with both the mast 42 and the rotor head 36 through the medium of a universally tiltable yoke member 61, the medial portion of which is tiltably secured to opposite sides of the mast on mast pivots 62 and the extremities of which are pivotally mounted on the ring element 52 by ring tilt pivots 63, the axes of which are in the plane of, but at right angles to, the axes of the mast pivots.

The pitch of the rotor blades 45 is manually controlled by the pilot through the medium of a collective pitch lever 64 from which a connecting rod 65 extends to the pilot's position. The lever 64 is pivoted on a pivot shaft 77 on the base sleeve 56 and is bifurcated to extend on opposite sides of the sleeve 56 as shown in FIG. 7. Shift pins 66 extend inwardly through vertical slots 67 in the sleeve and engage the outer race of an annular ball bearing assembly 68. A key pin 76 extends across the inner race of the bearing assembly and through a blade control rod 69 extending axially through the mast to transmit vertical movement of the bearing assembly to the control rod. The upper extremity of the axial blade control rod 69 is connected, within the rotor head 36, with any conventional type of flexible connection, such as a ball and socket joint or conventional universal joint (not shown), to a splined control rod stub 71 which extends upwardly through the rotor head 36 and is splined to the latter, as indicated at 72, so as to rotate in unison therewith.

A T-head member 73 is fixedly mounted on the upper extremity of the control rod stub 71 from which connecting link members 74 extend downwardly to lever arms 75 on the blade fittings 44. The lever arms 75 extend in opposite directions from the axes of their respective blade axle members 43 so that vertical movement of the blade control rod 69 will similarly and simultaneously pitch the blades 45.

There are two types of pilot control on the rotor system, Cyclic and Collective. Collective control is the placing by the pilot of equal pitch on the rotor blades for upward and downward movement in the air by actuating the blade control rod 69 vertically through the medium of the connecting rod 65 and the collective pitch lever 64 so as to adjust and set the pitch of both blades.

The cyclic pitch is controlled by manually tilting the non-rotating manual control ring element 52 in a desired direction so as to simultaneously and similarly tilt the rotating control element 52 to impart oppositely opposed, circumferentially variable pitches to the tip flaps 46 for tilting the rotor plane for directional flight or for levelling the rotor plane for vertical hovering.

While specific forms of the invention have been described and illustrated herein, it is to be understood that the same may be varied within the scope of the appended claim, without departing from the spirit of the invention.

Having thus described the invention, what is desired to be secured by Letters Patent is:

A helicopter rotor system comprising: a mast; a motor mount rotatably mounted on the upper extremity of said mast; a vertical axis motor rigidly mounted on said motor mount; an air screw mounted on and rotated by said motor in a horizontal plane; two blade arms mounted on and extending oppositely upwardly and radially outwardly from said motor mount; a radially extending rotor blade rigidly supported by each blade arm substantially in the plane of said air screw; an aileron shaft extending longitudinally of each rotor blade; a tip aileron mounted on the outer extremity of each aileron shaft; a crank element formed on the inner extremity of each aileron shaft; a gyro frame including two substantially parallel side portions tiltably mounted on said arms and concentrically surrounding the axis of said air screw; gyro bars extending oppositely outward from said gyro frame and terminating in gyro weights; each of said blade arms extending through one of said parallel side portions of said gyro frame to form a pivotal mounting for said gyro frame; said cranks engaging said parallel side portions eccentrically of said arms so that tilting movements of said gyro frame will cause corresponding tilting movements of said tip ailerons whereby deviation from a parallel relation between the plane of rotation of said rotor blades and the plane of rotation of said gyro frame will actuate said ailerons to tend to restore said parallel relation.

References Cited by the Examiner

UNITED STATES PATENTS

| | | | |
|---|---|---|---|
| 2,368,698 | 2/45 | Young | 170—160.13 |
| 2,399,076 | 4/46 | Trice | 170—160.25 |
| 2,510,006 | 5/50 | Young | 170—160.26 |
| 2,581,773 | 1/52 | Stalker | 170—160.25 |
| 2,633,924 | 4/53 | Young | 170—160.13 |
| 2,642,143 | 6/53 | Miller | 170—160.25 |
| 2,818,123 | 12/57 | Hiller | 170—160.25 |
| 2,827,968 | 3/58 | Sissingh | 170—160.25 |
| 2,892,502 | 6/59 | Donovan | 170—160.13 |
| 2,939,535 | 6/60 | Byre | 170—160.13 |
| 2,978,039 | 4/61 | Focke | 170—160.25 |
| 3,027,948 | 4/62 | Goland | 170—160.13 |
| 3,108,641 | 10/63 | Taylor | 170—160.16 |

FOREIGN PATENTS

| | | |
|---|---|---|
| 1,084,706 | 7/54 | France. |
| 695,918 | 9/40 | Germany. |

JULIUS E. WEST, *Primary Examiner.*

ABRUM BLUM, *Examiner.*